United States Patent
Carles et al.

(10) Patent No.: US 11,537,718 B2
(45) Date of Patent: Dec. 27, 2022

(54) METHOD FOR REPROGRAMMING DATA OF A SOFTWARE FUNCTION EXECUTED BY AT LEAST ONE COMPUTER PROVIDED WITH AT LEAST ONE EXECUTION CORE, AT LEAST ONE SECURITY CORE AND AT LEAST ONE NON-VOLATILE MEMORY

(71) Applicants: Continental Automotive France, Toulouse (FR); Continental Automotive GmbH, Hannover (DE)

(72) Inventors: Lauranne Carles, Pins Justaret (FR); Jérôme Monier, Gratens (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 266 days.

(21) Appl. No.: 16/955,991

(22) PCT Filed: Jan. 15, 2019

(86) PCT No.: PCT/FR2019/050073
§ 371 (c)(1),
(2) Date: Jun. 19, 2020

(87) PCT Pub. No.: WO2019/141932
PCT Pub. Date: Jul. 25, 2019

(65) Prior Publication Data
US 2021/0012009 A1 Jan. 14, 2021

(30) Foreign Application Priority Data
Jan. 16, 2018 (FR) .................................. 1850312

(51) Int. Cl.
*G06F 12/00* (2006.01)
*G06F 21/57* (2013.01)
*G06F 3/06* (2006.01)

(52) U.S. Cl.
CPC .......... *G06F 21/572* (2013.01); *G06F 3/0604* (2013.01); *G06F 3/0655* (2013.01); *G06F 3/0679* (2013.01); *G06F 2221/033* (2013.01)

(58) Field of Classification Search
CPC .... G06F 21/572; G06F 3/0604; G06F 3/0655; G06F 3/0679; G06F 2221/033; G06F 12/0646; G06F 12/0238
(Continued)

(56) References Cited

U.S. PATENT DOCUMENTS

2003/0028766 A1   2/2003  Gass et al.
2015/0324583 A1  11/2015  Emele et al.
2020/0082091 A1* 3/2020  Areno ................. G06F 9/45558

FOREIGN PATENT DOCUMENTS

FR    2905543 A1 * 3/2008 ............. G06F 21/72
KR  20100102666 A * 1/2010
(Continued)

OTHER PUBLICATIONS

International Search Report and Written Opinion for International Application No. PCT/FR2019/050073, dated Mar. 15, 2019, with partial translation, 12 pages.
(Continued)

*Primary Examiner* — Mardochee Chery
(74) *Attorney, Agent, or Firm* — RatnerPrestia

(57) ABSTRACT

A method for reprogramming data of a software function executed by an execution core and a security core, the data being present in two physically separate non-volatile memories, each managed by one of the execution or security cores, including the following steps: upon receiving a reprogramming request, a second value is stored in a first Boolean, determining whether the first Boolean is equal to the second value and if a second Boolean is equal to a first value, and if affirmative; an execution core is made to emit at a reinitialization request via a bidirectional communication channel towards a security core and a request to initialize a portion of the first non-volatile memory towards the set of functions for managing the non-volatile memory by an
(Continued)

execution core; a second value is stored in the second Boolean; it is determined whether a predetermined reprogramming event has taken place, and if affirmative, the first value is stored in the first Boolean, while keeping the second value in the second Boolean, and each security core is made to emit a request to write predetermined stored values to the set of functions for managing the memory associated with the non-volatile memory managed by the security core.

5 Claims, 2 Drawing Sheets

(58) Field of Classification Search
USPC .......................................................... 726/22
See application file for complete search history.

(56) References Cited

FOREIGN PATENT DOCUMENTS

| KR | 20100102666 A | * | 9/2010 |
| WO | 0075759 A1 | | 12/2000 |

OTHER PUBLICATIONS

International Search Report and Written Opinion for International Application No. PCT/FR2019/050073, dated Mar. 15, 2019, 17 pages (French).

Wolf, M., et al., "Design, Implementation, and Evaluation of a Vehicular Hardware Security Module," Nov. 30, 2011, pp. 302-318, Information Security and Cryptology—ICISC 2011, Springer Berlin Heidelberg, Berlin, Heidelberg.

* cited by examiner

METHOD FOR REPROGRAMMING DATA OF A SOFTWARE FUNCTION EXECUTED BY AT LEAST ONE COMPUTER PROVIDED WITH AT LEAST ONE EXECUTION CORE, AT LEAST ONE SECURITY CORE AND AT LEAST ONE NON-VOLATILE MEMORY

CROSS REFERENCE TO RELATED APPLICATIONS

This application is the U.S. National Phase Application of PCT International Application No. PCT/FR2019/050073, filed Jan. 15, 2019, which claims priority to French Patent Application No. 1850312, filed Jan. 16, 2018, the contents of such applications being incorporated by reference herein.

FIELD OF THE INVENTION

The technical field of the invention is the security of non-volatile-memory multicore computers and, more particularly, the security of non-volatile-memory multicore computers provided with security cores.

BACKGROUND OF THE INVENTION

Modern motor vehicles comprise computers for managing an increasing number of functions, in particular engine control, trajectory control or even the human-machine interface.

A computer comprises at least one memory and at least one processor having at least one execution core, called HOST execution core.

Each memory may comprise memory areas in which data may be stored or read by at least one HOST execution core.

The memories may be of NVMY (acronym for "non-volatile memory") type, which have the particular feature of keeping the data stored in the absence of a power supply. The stored data may be programs or program setting data or data resulting from the execution of programs.

The execution cores of the processor execute programs or portions of programs such as functions, independently or linked to the other cores.

The memories and the execution cores are able to be altered by an intrusion external to the system, this not being admissible for certain security-related applications, in particular the immobilizer of the vehicle.

For these applications, an HSM (acronym for "hardware security management") security core is added to the system in order to secure the most critical parts of these applications. This securing involves defining protected memory areas to and from which only the HSM security core is able to write and read. These protected memory areas are physically separate from the memory areas of the execution cores.

When developing a vehicle, it is sometimes necessary to reinitialize the memory areas linked to a function to a state similar to a factory settings state, that is to say with blank memory areas or with default values. Such a reset involves erasing or overwriting the memory areas linked to the function and located in non-volatile memory, performed by at least one HOST execution core upon receiving a specific reinitialization request.

In general, the data stored in an NVMY non-volatile memory are grouped by areas or channel. For each channel, specific properties are defined on the basis of the needs of the execution cores accessing it.

One of these properties relates to the resistance to erasure and may adopt a value "RESISTANT" or a value "NON-RESISTANT".

A "RESISTANT" channel is not erased during a reinitialization. The data it contains are retained.

A "NON-RESISTANT" channel is erased during a reinitialization. All of the data that it contains are lost during the reinitialization.

The data stored in the "NON-RESISTANT" channels of an NVMY non-volatile memory linked to a HOST execution core may be erased during a software reinitialization.

For each channel, an initialization function may be defined. This makes it possible to initialize the data that it contains to specific values and/or to perform predefined processing operations.

Such a reinitialization is made more difficult due to the presence of the HSM security core and of the data relating thereto in protected memory areas of the non-volatile memory.

Specifically, the data in the non-volatile protected memory and managed by the HSM security core cannot be modified or deleted by a request external to the HSM security core. They therefore cannot be erased or overwritten by the HOST execution core executing the reinitialization request.

However, certain security functions comprise data located both in memory areas managed by a HOST execution core and in memory areas managed by an HSM security core.

SUMMARY OF THE INVENTION

There is a need to reinitialize the data of a function contained in at least one non-volatile memory, one portion of the data being managed by a HOST execution core and another portion being managed by an HSM security core.

The subject of an aspect of the invention is a method for reprogramming data of a software function executed by at least one execution core and at least one security core, the data to be reprogrammed being present in at least one non-volatile memory managed by an execution core and in at least one non-volatile memory managed by a security core, the at least one non-volatile memory managed by an execution core being physically separate from the at least one non-volatile memory managed by a security core, each non-volatile memory being managed by a set of management functions. The method comprises the following steps:
  when a reprogramming request is received,
  storing a second value in a first Boolean,
  determining whether the first Boolean is equal to the second value and whether a second Boolean is equal to a first value,
  if this is the case, making an execution core transmit at least one reinitialization request via a bidirectional communication channel to the at least one security core managing a non-volatile memory comprising data to be reprogrammed and at least one initialization request to each set of management functions for the non-volatile memory managed by an execution core comprising data to be reprogrammed,
  after a predetermined period starting from the time of transmission of the at least one reinitialization request has elapsed,
  storing a second value in the second Boolean,
  determining whether a predetermined reprogramming event has taken place,
  if this is the case, storing the first value in the first Boolean, while at the same time keeping the second value in the second Boolean, and making the at least one security core managing a non-volatile memory comprising data to be reprogrammed transmit a request to write predetermined and stored values to the set of management functions for the memory associated with the non-volatile memory managed by said at least one security core, such that predetermined and stored values considered to be blank and associated with the software function are written to said non-volatile memory managed by said at least one security core comprising data to be reprogrammed.

It is possible to determine whether a predetermined initializing event took place before a reprogramming request was received, and if this is the case it is possible to initialize the first Boolean and the second Boolean with the first value.

The initializing event may be chosen from among the establishment of the power supply of the at least one execution core, of the at least one security core, of the non-volatile memories and of the associated management functions and a predetermined time delay.

The reprogramming request may comprise a software version number after reinitialization and, after the at least one reinitialization request has been transmitted to the at least one security core via a bidirectional communication channel, the software version may be stored after reinitialization, and the second Boolean may be modified such that it adopts a second value and so as to be able to determine whether a subsequent reinitialization request is a first request for the current version number.

The reprogramming event may be chosen from among a stoppage followed by a resumption of the power supply of the at least one execution core and of the at least one security core, of the non-volatile memories and of the associated management functions, a predetermined time delay corresponding to the estimated duration of the processing of the at least one reinitialization request.

BRIEF DESCRIPTION OF THE DRAWINGS

Other aims, features and advantages of aspects of the invention will become apparent on reading the following description, given solely by way of nonlimiting example, and with reference to the appended drawings, in which.

DETAILED DESCRIPTION OF THE PREFERRED EMBODIMENTS

In order to solve the technical problem, what is proposed is a two-part reprogramming method for performing a reinitialization under controlled request conditions of the data of a function partly located in a non-volatile memory area managed by at least one HOST execution core, another part being located in a non-volatile memory area managed by the HSM security core.

The description below is given for data managed by a HOST execution core and by an HSM security core. A person skilled in the art is able to apply this teaching to data managed by a plurality of HOST execution cores and by at least one HSM security core without exercising inventive skill by multiplying the messages, the requests and the Booleans such that the exchanges between a HOST execution core and an HSM security core comply with the description below.

Figure 1:
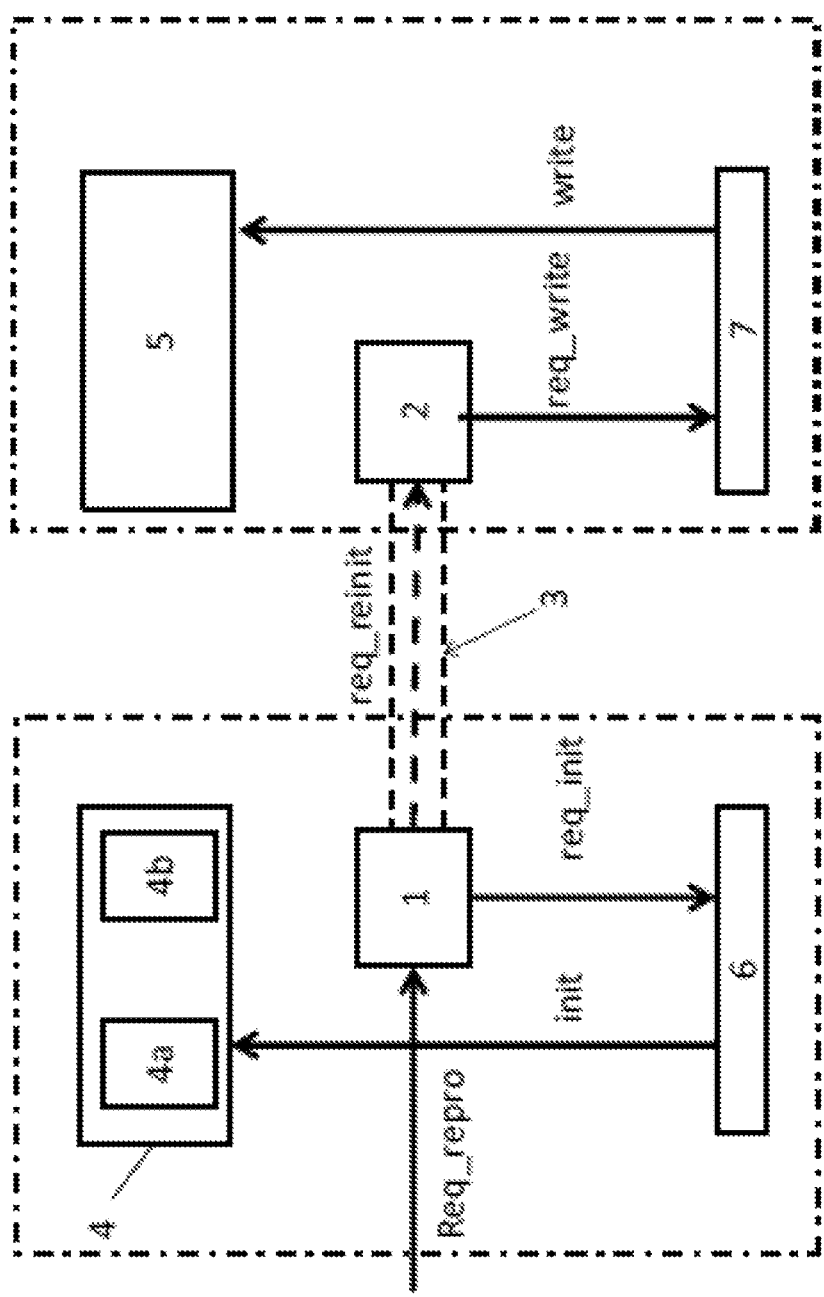
FIG. 1 illustrates the main hardware elements involved in the reprogramming method according to an aspect of the invention.

It may be seen in FIG. 1 that a first part of the reprogramming method is executed by a HOST execution core referenced 1, whereas a second part of the method is executed by the HSM security core referenced 2.

This is made possible due to the fact that the HOST execution core 1 and the HSM security core 2 are able to communicate by defining a bidirectional communication channel 3 for exchanging messages. The content of the messages is predefined and may comprise a request to execute a function with a list of parameters.

In order that the two parts of the method are able to communicate securely so that the data in the non-volatile memory that are managed by the HSM security core 2 are reinitialized, an additional message is added in the communication channel between the HOST execution core 1 and the HSM security core 2. This additional message is specific to the reprogramming method so as to avoid an inadvertent reinitialization or a diversion for intrusion purposes.

In addition to the presentation of the data in an NVMY memory given in the introduction, it is specified that the data managed by a HOST execution core 1 are contained either in a "NON-RESISTANT" channel 4a or in a "RESISTANT" channel 4b of a first NVMY memory 4. "RESISTANT" or "NON-RESISTANT" are respectively understood to mean resistant or non-resistant to reprogramming. The data managed by the HSM security core 2 are contained in a "RESISTANT" channel of a second NVMY memory 5 separate from the first NVMY memory 4.

For each of these channels, an NVMY memory initialization function is associated when there are no data, as is the case during the first startup. There are also data writing functions. These initialization and write functions cannot be called by a function, but by the management functions for the NVMY memory. There is thus a first set of management functions for the NVMY memory, referenced 6, associated with the first NVMY non-volatile memory 4, and a second set of management functions for the NVMY memory referenced 7 associated with the second NVMY non-volatile memory 5. A reprogramming request processed by a HOST execution core is the subject of an initialization request req_init intended for the first set 6 of management functions for the NVMY memory, which initializes the data (referenced "init" in FIG. 1) in the first non-volatile memory 4 that are managed by the HOST execution core on the basis of the format of the initialization request req_init and of the "RESISTANT" or "NON-RESISTANT" natures of the memory channels.

Furthermore, while the function for initializing the data in the first NVMY non-volatile memory 4 that are managed by a HOST execution core can be called at any time, the function for initializing the protected memory managed by the HSM security core 2 can be called only during the first initialization when no data are present in the second NVMY non-volatile memory 5 managed by the HSM security core 2. No other condition is provided in this initialization function, and there is no provision for the HSM security core 2 to be able to receive an initialization request other than the first initialization request.

It is thus necessary to simulate an initialization by making the HSM core 2 transmit a write request req_write to the set 7 of management functions for the NVMY memory relating to the second NVMY non-volatile memory 5 managed by the HSM security core 2 such that the second NVMY non-volatile memory 5 is in a state similar to the one that would be achieved following an initialization. This simulation involves writing (referenced "write" in FIG. 1) predetermined and stored blank values to the second NVMY non-volatile memory 5.

Figure 2:
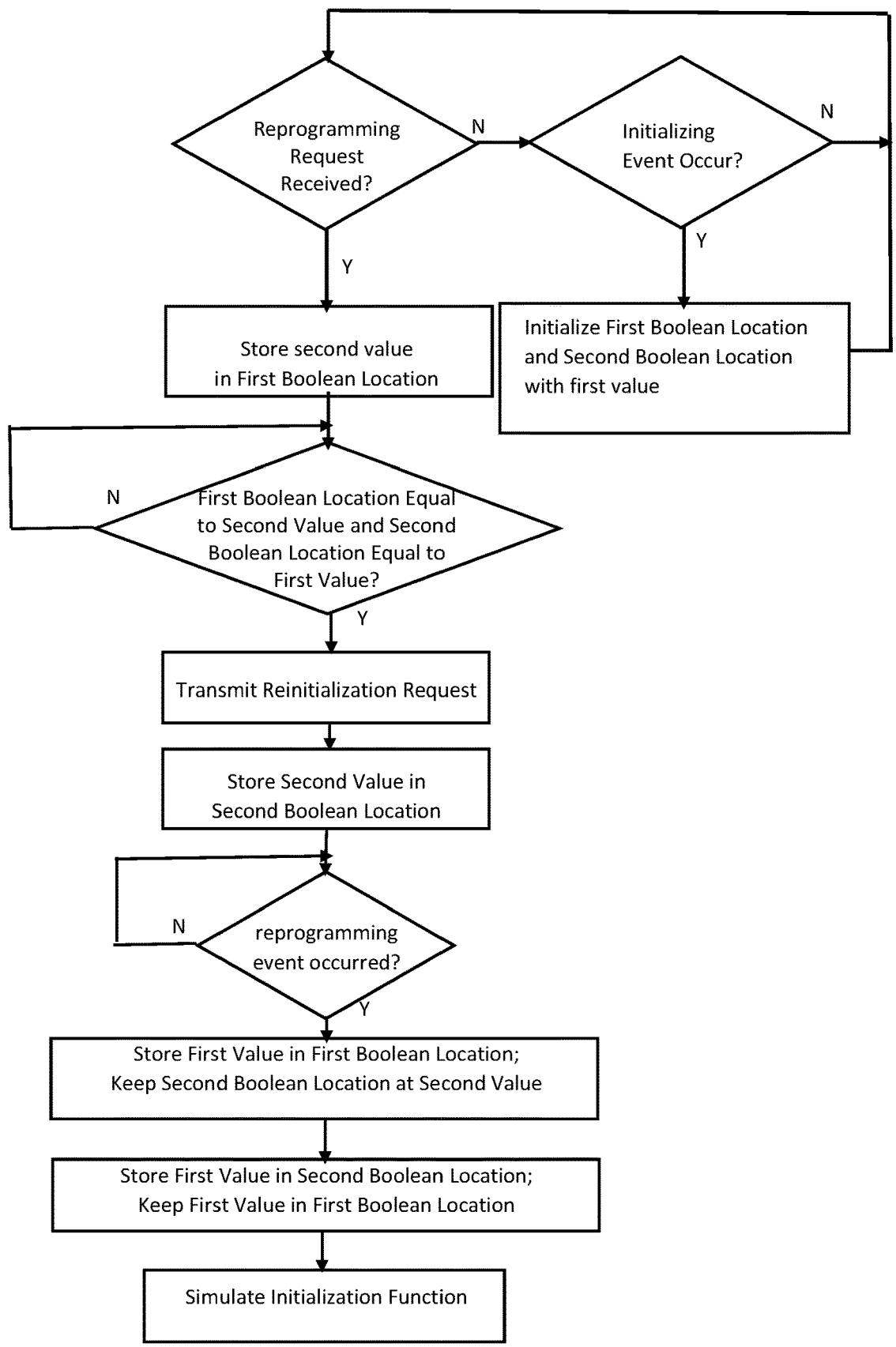
FIG. 2 illustrates the main steps of the reprogramming method according to an aspect of the invention.

The steps of the reprogramming method, which are illustrated by FIG. 2, will now be described.

The method starts with a first step E1 during which the occurrence of an initializing event, following which Booleans are initialized with a first value, is determined. In one embodiment, the initializing event is the establishment of the power supply of the HOST core 1, of the HSM core 2, of the non-volatile memories and of the associated management functions.

Upon reception of a reprogramming request req_repro by the HOST execution core 1 regarding the software function having data in the first non-volatile memory 4 and in the second non-volatile memory 5, the first Boolean is modified such that it adopts a second value, in a second step E2.

When the first Boolean is equal to a second value, if the second Boolean is equal to a first value, and if the software version number of the reprogramming request req_repro is different from the version stored in the "RESISTANT" channel managed by the HOST core, the HOST core 1 is made to transmit a reinitialization request req_reinit to the HSM security core 2 via the bidirectional communication channel 3 and an initialization request req_init to the set 6 of management functions for the NVMY memory associated with the first NVMY non-volatile memory 4 in a third step E3.

In a fourth step E4, after the reinitialization request has actually been transmitted, the software version of the reprogramming request is stored and a second Boolean is modified such that it adopts a second value. The reinitialization request is considered to have been actually transmitted when a period equal to the period between two execution cycles has elapsed (for example 10 ms).

Storing the software version of the reprogramming request allows a subsequent comparison with the software version associated with a subsequent reprogramming request, so as to determine whether the subsequent reprogramming request is a first request for the current version number.

The transition of the second Boolean to the second value makes it possible, in conjunction with a first Boolean to the second value, to store the fact that the reinitialization request has been transmitted.

Storing the software version and changing the value of the second Boolean make it possible to avoid subsequent reinitialization requests being transmitted to the HSM security core while the first reinitialization request is being processed.

After a reprogramming event such as a stoppage of the power supply of the HOST core 1 and of the HSM core 2 followed by a resumption of this power supply, the first value is stored in the first Boolean, while at the same time keeping the second value in the second Boolean, in a fifth step E5.

The fact that a reinitialization request has taken place previously is thus stored.

After a predetermined period such as the period between two execution cycles (for example 10 ms), the first value is stored in the second Boolean, while at the same time keeping the first Boolean at the first value, in a sixth step E6. There is thus a return to the nominal case while awaiting a new reprogramming request.

The method continues with a seventh step E7 executed by the HSM security core, in which, upon reception of the reinitialization request req_reinit via the bidirectional communication channel 3, the initialization function associated with the second NVMY non-volatile memory 5 managed by the HSM security core 2 is simulated. Specifically, as explained above, this initialization function cannot be called by the function whose data are to be reinitialized, or by the set 6 of NVMY management functions past the first initialization, and it is necessary to use a simulation.

Simulation is understood to mean making the HSM core 2 transmit a write request req_write to the write function of the second set 7 of management functions for the NVMY memory associated with the second NVMY non-volatile memory 5 such that predetermined and stored values considered to be blank are written to the second non-volatile memory 5 managed by the HSM security core 2. At the end of the write operation, referenced write, the second NVMY non-volatile memory 5 is thus obtained in a state similar to the state resulting from the first initialization. Blank values are understood to mean predetermined values stored either in the HSM core 2 or in a "RESISTANT" channel of the second NVMY non-volatile memory 5. Moreover, the data of a function in the first NVMY non-volatile memory 4 may be reinitialized following an explicit request to erase the data from the NVMY non-volatile memory or a reinitialization of a new software version.

In the first case, all of the "NON-RESISTANT" channels in the first NVMY non-volatile memory 4 are erased.

In the second case, the "NON-RESISTANT" channels in the first NVMY non-volatile memory 4 will be erased only if the software version number stored in the reprogramming request is different from the version number stored in the "RESISTANT" channel of the first NVMY non-volatile memory 4. This is in particular the case when the aim is to have default values without modifying the software version.

In addition to the embodiment described above, it is noted that several alternative embodiments are obtained by altering one and/or the other of the initializing event and the reprogramming event.

In a first alternative embodiment, consideration is given to a first initializing event different from the establishment of the power supply of the cores, such as a predetermined time delay.

In a second alternative embodiment, consideration is given to a second reprogramming event different from a sequence of interrupting/resuming the power supply of the cores, such as a predetermined time delay corresponding to the estimated duration of the processing of the reinitialization request, or a message confirming the processing of the reinitialization request transmitted by the HSM security core 2 and received by the HOST execution core 1.

When a first and a second reprogramming event are time delays, a person skilled in the art will understand that the method is executed in a loop by the respective cores (the seventh step is then executed in loop by the HSM security core 2, whereas the first to sixth steps are executed in a loop by the HOST execution core 1).

A person skilled in the art will also understand that the first and second alternative embodiments may be combined.

When the software function is executed by a plurality of execution cores and by a plurality of security cores, the reprogramming request req_repro is received by an execution core. The execution core that received the request applies the various steps of the method as described above. However, in parallel with the initialization request to the set of management functions for the non-volatile memory that it manages itself, it transmits initialization requests to the sets of management functions for the non-volatile memory managed by the other execution cores. Likewise, the execution core that received the reprogramming request transmits a reinitialization request to each security core via separate bidirectional communication channels.

The operating mode of the reprogramming method when more than one execution core and more than one security core are involved has been described above in the case of master-slave operation. However, other communication and supervision modes, such as decentralized or step-by-step communication modes, may be used while at the same time remaining within the scope of an aspect of the invention, as long as each set of management functions for the non-volatile memory in which data of the software function that is the subject of the reprogramming are stored receives an initialization request req_init or a write request req_write.

The invention claimed is:

1. A method for reprogramming data of a software function executed by at least one execution core and at least one security core, the data to be reprogrammed being present in at least one non-volatile memory managed by an execution core and in at least one non-volatile memory managed by a security core, the at least one non-volatile memory managed by an execution core being physically separate from the at least one non-volatile memory managed by a security core, each non-volatile memory being managed by a set of management functions, comprising:
   when a reprogramming request is received,
   storing a second value in a first Boolean location,
   determining whether a value in the first Boolean location is equal to the second value and whether a value in a second Boolean location is equal to a first value,
   if this is the case, making an execution core transmit at least one reinitialization request via a bidirectional communication channel to the at least one security core managing a non-volatile memory comprising data to be reprogrammed and at least one initialization request to each set of management functions for the non-volatile memory managed by an execution core comprising data to be reprogrammed,
   after a predetermined period starting from the time of transmission of the at least one reinitialization request has elapsed, storing the second value in the second Boolean location,
   determining whether a predetermined reprogramming event has taken place,
   if this is the case, storing the first value in the first Boolean location, while at the same time keeping the second value in the second Boolean location, and making the at least one security core managing a non-volatile memory comprising data to be reprogrammed transmit a request to write predetermined and stored values to the set of management functions for the memory associated with the non-volatile memory managed by said at least one security core, such that predetermined and stored values considered to be blank and associated with the software function are written to said non-volatile memory managed by said at least one security core comprising data to be reprogrammed.

2. The method as claimed in claim 1, wherein it is determined whether a predetermined initializing event took place before a reprogramming request was received, and if this is the case the first Boolean location and the second Boolean location are initialized with the first value.

3. The method as claimed in claim 2, wherein the initializing event is chosen from among activating the power supply of the at least one execution core, of the at least one security core, of the non-volatile memories and of the associated management functions and a predetermined time delay.

4. The method as claimed in claim 1, wherein the reprogramming request comprises a software version number after reinitialization and, after the at least one reinitialization request has been transmitted to the at least one security core via a bidirectional communication channel, the software version is stored after reinitialization, and the second Boolean location is modified such that it adopts the second value and so as to be able to determine whether a subsequent reinitialization request is a first request for the current version number.

5. The method as claimed in claim 1, wherein the reprogramming event is chosen from among a stoppage followed by a resumption of the power supply of the at least one execution core and of the at least one security core, of the non-volatile memories and of the associated management functions, a predetermined time delay corresponding to the estimated duration of the processing of the at least one reinitialization request.

* * * * *